July 29, 1941.  A. PISCHINGER  2,250,877
FUEL INJECTOR FOR INTERNAL COMBUSTION ENGINES
Filed June 25, 1940
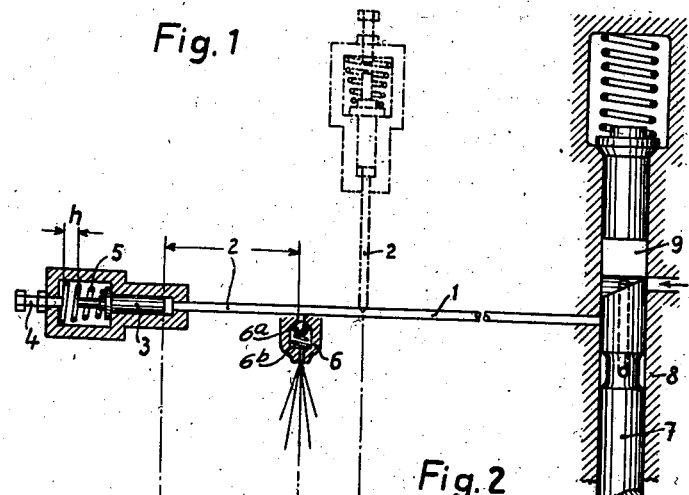
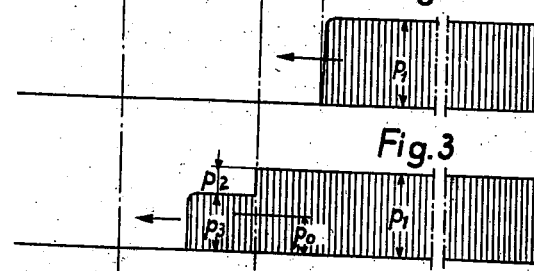
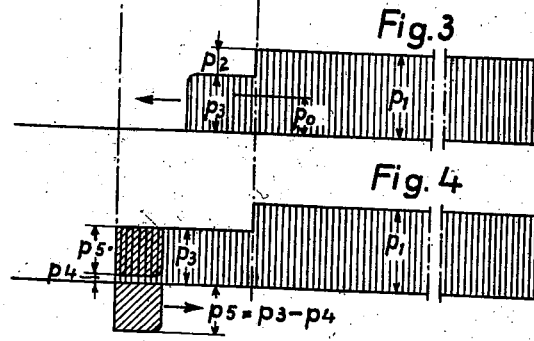
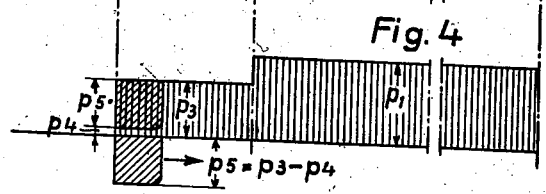
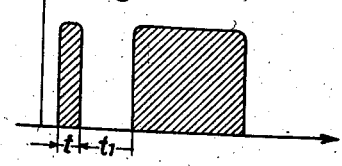
Inventor:
Anton Pischinger
by Knight Bros
attorneys Patented July 29, 1941

2,250,877

UNITED STATES PATENT OFFICE 2,250,877

FUEL INJECTOR FOR INTERNAL COMBUSTION ENGINES

Anton Pischinger, Cologne-Deutz, Germany, assignor to Klöckner-Humboldt-Deutz, Aktiengesellschaft, Cologne-Deutz, Germany, a corporation of Germany Application June 25, 1940, Serial No. 342,219
In Germany May 19, 1939

1 Claim. (Cl. 123—139)

The invention relates to a fuel injection device for internal combustion engines in which liquid fuel is injected into the cylinder. Its principal object is to enable a pre-injection to be carried out with the injection valve used for the main injection, for the purpose of reducing the hard action of the engine. The known fuel injection devices of this kind require a special construction of the fuel pump for the purpose of producing a pre-injection. In contrast to these a pre-injection with a normal fuel injection pump is carried out in accordance with the invention, by connecting to the fuel injection conduit, a branch conduit at the end of which is an expansible chamber having a limited amount of expansion and adapted to yield to a pressure such that a pressure wave reaching it is momentarily reduced below the pressure required to open the injection valve.

An illustrative example of the invention is shown in the drawing.

Fig. 1 shows the pre-injection device combined with an equalizing pump;

Figs. 2 to 4 are diagrams showing various phases of the pressure wave in the injection conduit; and Fig. 5 is a diagram showing the injection principle realized by the device shown in Fig. 1.

To a fuel injection conduit 1 is connected a branch conduit 2, at the end of which is a device forming an expansible chamber, shown in this instance as cylinder 3a containing a spring-loaded yielding piston 3. Opposite the yielding piston is provided an adjustable stop 4, which limits the stroke of the piston 3. An injection nozzle 6 is connected to the injection conduit 1 and is controlled by a check valve 6a urged toward closed position by a spring 6b. The spring 5 acting on the piston 3 has a characteristic such that a pressure lower than that required to open the injection valve 6a can displace the yielding piston.

As soon as the piston 7 of fuel pump 8 connects the pump chamber 9 with the fuel injection conduit 1, a pressure wave having a pressure $p_1$ (Fig. 2) travels through the injection conduit 1. The pressure wave first reaches the injection nozzle 6 and starts the injection. Thereby it is reduced by a value $p_2$ to the pressure $p_3$ (Fig. 3). Shortly after that, after it has travelled through the section of conduit 2, the pressure wave reaches the yielding piston 3 and displaces it by the distance $h$, up to its rigid stop 4. By the displacement of the yielding piston the volume of the injection conduit 1 is suddenly enlarged by the amount $h \cdot F$, F being the surface of the yielding piston 3. Thereby the pressure wave is reduced below the pressure $p_0$ required to open the injection valve 6a to the pressure $p_4$. $p_4$ equals $$\frac{P}{F}$$

P being the force of the spring 5 and F the surface of the yielding piston. The pressure $p_4$ is lower than the pressure $p_0$. A wave of rarefaction, $p_5$, is produced and travels back to the fuel pump (Fig. 4) and, as soon as it reaches the fuel nozzle 6, interrupts the injection. After the fuel pump has again filled up the enlarged space $h \cdot F$ opened by the yielding piston, the injection pressure is again established and is not terminated until the fuel pump interrupts the feed of fuel into the injection conduit. There results, accordingly, the injection diagram shown in Fig. 5. The fuel quantity injected per second, $a$, is determined by the pressure drop $p_1 - p_0$ and the cross section of the nozzle opening. $p_1$ is the pressure of the pressure wave and $p_0$ is the pressure which opens the valve of the injection nozzle. The time interval, $t$, of the pre-injection is equal to the sum of the time intervals which the pressure wave and the wave of rarefaction require to travel through the section of conduit 2. Since the travelling time of the pressure wave is practically equal to that of the wave of rarefaction the time $t$ is equal to twice the time of travel of the pressure wave through the section of conduit 2. The information is therefore at hand to fix the quantity of fuel pre-injected as desired, by a suitable length dimension of the injection conduit 2. The time interval $t_1$ between the pre-injection and main injection is determined by the volume $F \cdot h$ released by the yielding piston 3. The time interval $t_1$ is larger, the larger the volumn $F \cdot h$, and can be adjusted to requirements by setting the stop 4.

The section of conduit 2 can be connected to the injection conduit 1 at any desired place, for instance as shown in dot and dash lines in Fig. 1. The pressure wave $p_1$ then branches at the the point of connection of the section of conduit 2 and runs simultaneously to the injection nozzle and to the yielding piston. The wave of rarefaction travelling back in the conduit section 2 reduces the pressure wave travelling to the injection valve, upon arrival at the point of connection, and creates in the pressure wave, to a certain extent, a gap of low pressure, by which the injection is interrupted.

The injection device is of course not limited to equalizing pumps, but can be used with any kind of fuel pump. With fuel pumps in which the injection pressure $p_1$ of the pressure wave changes with the speed of the engine, the length of the conduit section 2 and the stroke $h$ are determined with reference to the normal driving speed of the engine.

I claim:

In a fuel injecting system for internal combustion engines, a valve-controlled nozzle, an injection conduit for conducting fuel to said nozzle, means urging said nozzle valve to closed position and yieldable to pressure of the fuel in said supply conduit, a pump adapted to force fuel intermittently into said injection conduit at an initial pressure at least slightly greater than the pressure at which said nozzle valve is urged to closed position, means forming a yieldingly expansible chamber, a branch conduit connecting said expansible chamber to said injection conduit, means limiting the expansion of said chamber, the means forming said expansible chamber being adapted to yield to a pressure lower than the pressure at which said nozzle valve is urged to closed position, whereby a pressure wave generated by said pump is reduced, upon reaching said expansible chamber, to a pressure below said nozzle valve opening pressure.

ANTON PISCHINGER.